United States Patent
Marinho et al.

(10) Patent No.: US 11,418,955 B2
(45) Date of Patent: Aug. 16, 2022

(54) SYSTEM AND METHODS FOR TRANSIT PATH SECURITY ASSURED NETWORK SLICES

(71) Applicant: SECUREG, Sterling, VA (US)

(72) Inventors: John Marinho, Washington, DC (US); Carlos Solari, Sterling, VA (US); Matthew Silveira, Placerville, CA (US); Russell Housley, Herndon, VA (US); William C. Epstein, Salt Lake City, UT (US); Timothy Ray Newman, Edgewater, MD (US); Charles Clancy, McLean, VA (US); Sean Turner, Washington, DC (US)

(73) Assignee: SECUREG, Sterling, VA (US)

( * ) Notice: Subject to any disclaimer, the term of this patent is extended or adjusted under 35 U.S.C. 154(b) by 0 days.

(21) Appl. No.: 17/321,405

(22) Filed: May 15, 2021

(65) Prior Publication Data
US 2021/0360401 A1 Nov. 18, 2021

Related U.S. Application Data

(60) Provisional application No. 63/049,151, filed on Jul. 8, 2020, provisional application No. 63/025,744, filed on May 15, 2020.

(51) Int. Cl.
*H04W 12/069* (2021.01)
*H04L 9/40* (2022.01)
(Continued)

(52) U.S. Cl.
CPC ........ *H04W 12/069* (2021.01); *H04L 45/32* (2013.01); *H04L 49/208* (2013.01); *H04L 63/0823* (2013.01)

(58) Field of Classification Search
None
See application file for complete search history.

(56) References Cited

U.S. PATENT DOCUMENTS

2012/0317569 A1 12/2012 Payne, Jr. et al.
2013/0182722 A1 7/2013 Vishveswaraiah et al.
(Continued)

FOREIGN PATENT DOCUMENTS

WO 2019/197883 A1 10/2019

OTHER PUBLICATIONS

International Search Report and Written Opinion dated Sep. 28, 2021 in corresponding PCT application No. PCT/US2021/032643.
(Continued)

*Primary Examiner* — Brandon Hoffman
(74) *Attorney, Agent, or Firm* — Nields, Lemack & Frame, LLC

(57) ABSTRACT

Systems and methods of configuring, managing and ensuring security compliance of Virtual Network Slices that transit through physical networks, virtual networks (SDN), cloud networks, radio access networks, service provider networks, and enterprise networks are identified. The methods include user side security validation methods while attempting to use a network slice for a specific service, and security validation of physical or virtual networks and the associated transit network elements. The methods disclose enriching the Security Certificates with policy parameters and the associated procedures that transit elements are required to assure for security compliance. Additionally, methods for incorporating a mobile native security platform in Wireless Mobile Network (4G/5G) that supports generating X.509 Certificates enhanced with policy requirements, validating allowed/disallowed list of transit network vendor devices, virtual network appliances are identified.

14 Claims, 11 Drawing Sheets

(51) Int. Cl.
   *H04L 45/00* (2022.01)
   *H04L 49/20* (2022.01)

(56) References Cited

U.S. PATENT DOCUMENTS

| | | |
|---|---|---|
| 2017/0079059 A1 | 3/2017 | Li et al. |
| 2017/0357818 A1 | 12/2017 | Sheehan et al. |
| 2019/0386969 A1* | 12/2019 | Verzun .................. H04L 63/102 |
| 2021/0144517 A1* | 5/2021 | Guim Bernat ........ H04L 9/3213 |

OTHER PUBLICATIONS

Kotulski et al., "On end-to-end approach for slice isolation in 5G networks. Fundamental challenges.", Federated conference on computer science and information systems (FedCSIS). IEEE, Sep. 6, 2017, <https:l/ieeexplore.ieee.org/abstracVdocument/8104638>.
Marek "The security conundrum of network slicing", Light Reading., Apr. 13, 2020, <https://www.lightreading.com/security/the-security-conundrum-of-network-slicing/d/d-id/758814>.

* cited by examiner

- STANDARD X.509 CERTIFICATE ATTRIBUTES
  - VERSION
  - SERIAL NUMBER (CERTIFICATE SERIAL NUMBER)
  - SIGNATURE ALGORITHM
  - ISSUER
  - VALID FROM AND VALID TO
  - SUBJECT
  - PUBLIC KEY
  - SUBJECT ALTERNATIVE NAME (SAN)
  - BASIC CONSTRAINTS
  - SUBJECT KEY IDENTIFIER (SKI)
  - KEY USAGE
  - CRL DISTRIBUTION POINTS
  - EXTENDED KEY USAGE (EKU)
  - AUTHORITY KEY IDENTIFIER (AKI)
  - AUTHORITY INFO ACCESS
  - THUMBPRINT ALGORITHM
  - THUMBPRINT

CERTIFICATE

| FIELD | VALUE |
|---|---|
| VERSION | V3 |
| SERIAL NUMBER | 1D CD 33 4A 86 DD EB FD 41 2E... |
| SIGNATURE ALGORITHM | SHA256RSA |
| SIGNATURE HASH ALGORITHM | SHA256 |
| ISSUER | XYZ CLASS 3 EV SSL CA-... |
| VALID FROM | TUESDAY, APRIL 07, 2015 5:00:... |
| VALID TO | THURSDAY, APRIL 07, 2016 4:59... |
| SUBJECT | KNOWLEDGE OM IT |

CERTIFICATE EXTENSIONS

ENHANCED DIGITAL CERTIFICATIONS MAY INCLUDE:

- MANUFACTURING SERIAL NUMBER
- HARDWARE MAKE
- HARDWARE MODEL
- REVISION
- REGION (MANUFACTURING)
- LOCATION (MANUFACTURING)
- DATE OF MANUFACTURE
- ....

CUSTOM SECUREG X.509 CERTIFICATES EXTENSIONS WOULD BE DEFINED BY THE PARTICIPANTS OF THE NETWORK AND WOULD BE STANDARDIZED ACROSS ALL PARTICIPANTS.

CERTIFICATE

| FIELD | VALUE |
|---|---|
| VERSION | V3 |
| SERIAL NUMBER | 1D CD 33 4A 86 DD EB FD 41 2E... |
| SIGNATURE ALGORITHM | SHA256RSA |
| SIGNATURE HASH ALGORITHM | SHA256 |
| ISSUER | XYZ CLASS 3 EV SSL CA-... |
| VALID FROM | TUESDAY, APRIL 07, 2015 5:00:... |
| VALID TO | THURSDAY, APRIL 07, 2016 4:59... |
| SUBJECT | KNOWLEDGE OM IT |

○ GOOGLE CLOUD DATACENTERS
◎ AWS DATACENTERS
△ ENTERPRISE LOCATIONS
▷ CLOUD HOSTED APPLICATION SERVERS

SYSTEM AND METHODS FOR TRANSIT PATH SECURITY ASSURED NETWORK SLICES

This application claims priority of U.S. Provisional Patent Application Ser. Nos. 63/025,744 filed May 15, 2020; and 63/049,151 filed Jul. 8, 2020, the disclosures of which are incorporated herein by reference in their entireties.

BACKGROUND

Public Key Infrastructure (PKI) uses X.509 Digital Certificates that facilitate validating identity and trust of entities, such as hardware devices, Operating Systems, Applications and others, for establishing secure communications. PKI uses Public and Private Keypairs associated with an entity (such as a first entity), where only the public key is communicated with a remote entity (referred to as the second entity, which may be, for example a web server), and when communication is encrypted with the public key, only the first entity that is holding the private key can decipher the encrypted information. PKI uses a plurality of infrastructure components such as CA (Certification Authority), RA (Registration Authority), TA (Trust Anchor) and others, for validating the authenticity of the Digital Certificates. Using PKI methods is well known and extensively used for secure communication over the internet. Examples include IPsec (Internet Protocol Security), TLS (Transport Layer Security), and others. As shown in FIG. 2, X.509 Certificates include several identifiers, that when combined, uniquely identify the certificate, key algorithms, subject (identity of the certificate owner), serial number, certificate issuer, validity periods (start time, end time), certificate management and revocation information, and certificate policies.

End-systems, protocol terminating endpoints and applications such as client applications, servers and other resources that use an encryption protocol (such as IPsec, TLS and others) to secure communications. When establishing a trusted communication path, each endpoint validates the trust of the remote endpoint using PKI methods that use Digital Certificates. Also, endpoints that terminate protocols or offer services validate identity and trust of the other using Digital Certificates and PKI methods even if such communication is not encrypted. The two endpoints typically communicate through a plurality of local, private or public networks (for example Internet, public cloud, private cloud, SDN) of multiple operators or service providers. These communications pass through many physical or virtual network switches, Layer 2 bridges, Layer 3 routers. Transit networks forward user data packets based on Layer 2 or Layer 3 addresses within the packets using source learning (MAC Bridging), or routing (L3 Routing) or forwarding paths orchestrated by a network controller (e.g., SDN controller). If the transit network uses Virtual Network Functions (VNF), there may be multiple layers of networking, for example, using VXLANs or GRE tunnels. While the above describes secure communication, other resources may also make use of this concept.

Enterprises are migrating to SDN, SD-WAN, and Cloud Environments using Virtual Networks, Virtual Servers, and Commodity platforms that are shared by multiple tenant enterprises, for many reasons. These include greater flexibility, growth, reduced operational cost, transporting classified and highly sensitive data. In these scenarios, it is essential that every physical and virtual network element guarantees policies that do not compromise the security of the data being transported.

Further, it is important that the physical and network elements are from an approved (trusted) source consistent with the policy of use. This is to assure that these network elements (NEs) will remain available during times of crisis and not subject to disruption if the provider (OEM) of the network element is an adversary potentially using a maintenance backdoor to intentionally create the disruption as a tool of war.

As enterprises that handle sensitive information move to virtual/cloud networks, and applications move to mobile networks for anytime access, the networks that carry the sensitive data are shared on the same physical resources with layers of virtualization. Security compromises in the shared network, or bad actors may get access to or get copies of clear or encrypted transit traffic. While endpoints, such as client and server, may encrypt data during transfer through the network, with ever increasing compute resources (such as CPU, Memory, Storage, Network), the data may be copied in the transit shared network and decrypted. An endpoint that participates in control plane or application protocols whose trust/identity is not assured could copy or direct flows to malicious bad actors. Malware and bad actors may take advantage of the security holes and deficiencies in the network, the computing devices and the software. In many cases, these security holes are dependent on specific vendor hardware/software or specific version and model numbers or where they are manufactured, distributed, or installed. The prior art routing and forwarding methods use destination L2 or L3 addresses at each physical or virtual network hops without consideration of device vendors, models, manufacturing locations etc. Additionally, enterprises that use the transit networks for transporting highly sensitive data do not have visibility or control over which devices or paths (locations), their sensitive data traverses through. While Layer 3 routing methods include source routing where a source dictates the route that its packets traverse, these routes specify IP Addresses and not virtual or physical device provenance data. Restricting network paths, and physical or virtual network functions (VNFs) that participate in control and application protocols and provide services to physical and virtual network, computing and storage elements whose trust could be assured from start to operational use via Digital Certificates significantly reduces security compromises.

5G Architecture teaches the concept of "Network Slices" (NS), by which an operator offers network services with different Quality of Service (QOS) such as bandwidth, delay, priority etc., on the same physical and virtual network, compute, memory and storage resources for differing vertical application uses, such as IOT, Healthcare, V2X and others. The network slices may span across an operator's access and core networks. The network slices facilitate offering Macro and Micro services with different QOS requirements on the same infrastructure. The creation and management of network slices is specific to the operator.

Therefore, it would be beneficial if there were a system and methods that extended the concept of "Network Slices" to improve the trust and security of communications.

SUMMARY

The present application describes "Secure Network Slices", which are logical networks between a plurality of physical or virtual endpoints (VNFs) such as client applications, application servers, database servers, proxies, protocol endpoints and enterprise edges where the transit physical or virtual network elements are trust assured by enhanced X.509 Digital Certificates. The certificate enhancements include but are not limited to provenance metadata attributes, such as the Name of the manufacturer, Country and Geographical Region, permitted and prohibited list of manufacturers, manufacturing locations, model number, version/revision number etc. User applications, such as IPsec and TLS, may establish secure encrypted sessions between clients and servers over the SNS logical networks. While setting up and managing the "Secure Network Slice" (SNS), every transit network element that is permitted to carry traffic is validated to assure that it holds the enhanced digital certificate per the required security policies. The transit 5G Access and Core network that carries the SNS may include multiple network domains by multiple operators, Public and Private Clouds, Software Defined Networks (SDNs), private networks and others. Additionally, when the underlying network is reconfigured due to network failures, load balancing of VNFs, or other reasons, the SNS provider assures that the re-routed traffic transits through trust validated NEs or revalidates the trust of NEs. The methods identified herein may be incorporated as layered software modules within physical or virtual network elements to create, manage, assure, monitor and validate secure network paths for macro and micro application services.

BRIEF DESCRIPTION OF THE DRAWINGS

For a better understanding of the present disclosure, reference is made to the accompanying drawings, in which like elements are referenced with like numerals, and in which:

FIG. 2 shows an example of a prior art X.509 Digital certificate with standard attributes, such as Version, Certificate Serial Number, Signature Algorithm, Issuer (identity of the issuer), validation period, subject which identifies what the certificate is for, Public Key, Subject Alternative Name and other parameters.

FIG. 3 shows example metadata extensions to the X.509 Certificate, which is termed an enhanced Digital Certificate (eDC).

DETAILED DESCRIPTION

Figure 1A:
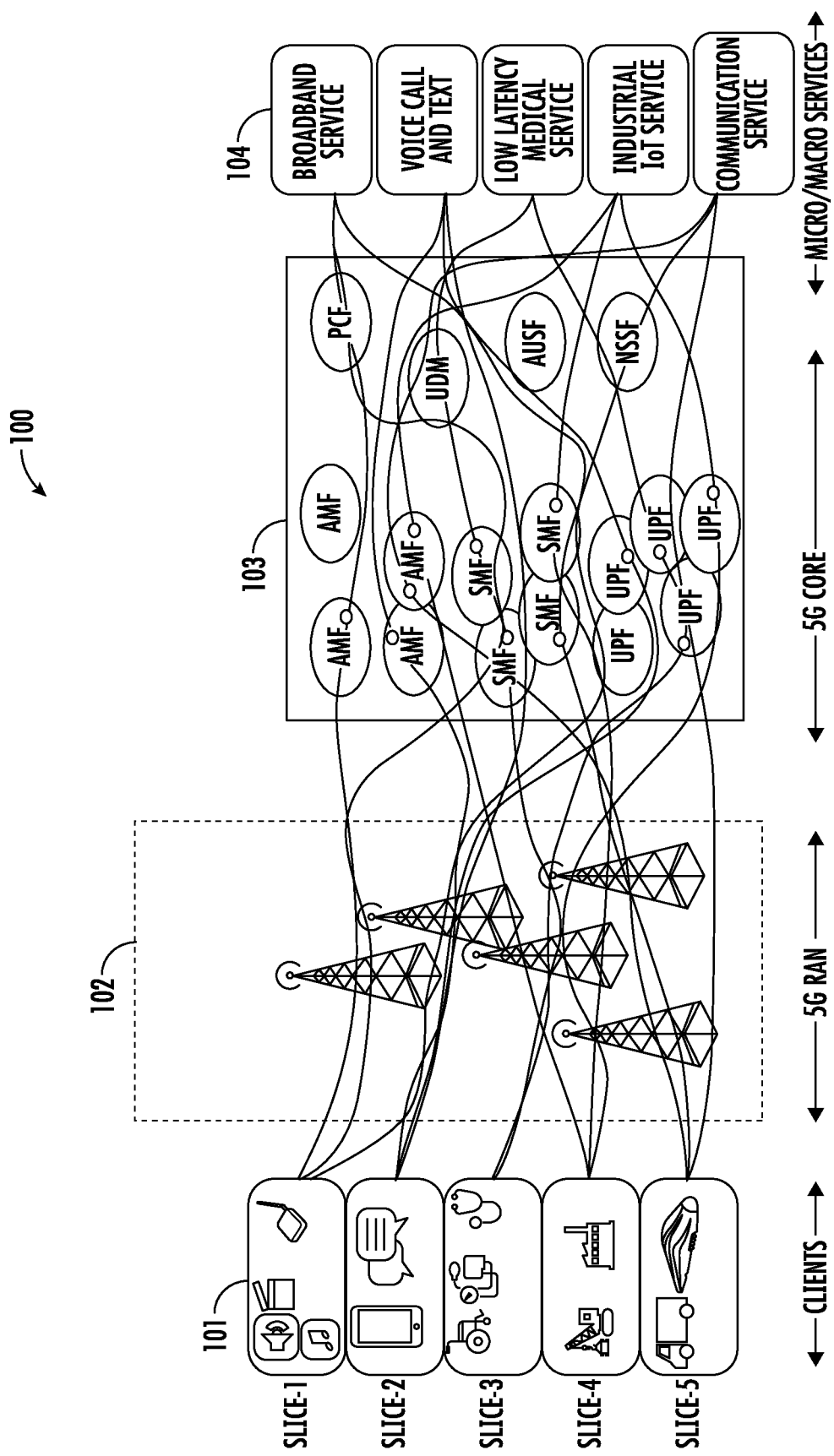
FIG. 1A is an example network infrastructure where the methods disclosed herein may be deployed.

The present disclosure extends the network slices defined in 5G to include additional trust and security policies in addition to QOS levels. Additionally, the "Secure Network Slices", disclosed herein are end to end, for example, between one geographical location of an enterprise to another geographical location traversing multiple operator networks.

The present disclosure defines additional metadata attributes, such as provenance data which includes the country, region, specific location where the subject of the certificate is manufactured, identity of the manufacturer, model, version, and other parameters, as shown in FIG. 3. The specific metadata attributes that an entity is required to support for enhanced trust are dependent on the specific enterprise and the departmental or operational use case.

As described above, the present disclosure is directed toward "Secure Network Slices", which may be incorporated as layered software within physical or virtual network elements to create, manage, assure, monitor and validate secure network paths for macro and micro application services. Embodiments of this may include:

(1) A layer of security that requires compliance of the transit physical or virtual network elements that process sensitive data of high security enterprises (such as the DOD, Financial Services and others) based on metadata attributes in Enhanced Digital Certificates (eDC). The security layer assures security of the path by taking into account:
    requirements of physical paths,
    identity of the transit physical/virtual network elements, their types,
    vendor identification, and
    additional policies managed by the Security Management platform, type of network forwarding functions (L2 Bridging, switching, routing), types of routing (source routing, hop-by-hop routing), redundancy, service provider boundaries and the associated enhanced digital certificates.

(2) Security Assured Virtual Routing—In a layered network element (NE) that includes hardware, multiple layers of software, cloud-network, and validation of allowed/prohibited vendors, creating compliant Virtual/Physical interface port groups, where each interface is allowed as a member based on the next-hop network element that it connects to. If the transit path traverses through multiple communication service providers (CSPs) or Cloud providers, at the edge that connects two providers, cross validation of certificates, and validating the compliance of the specified requirements from both the service providers is essential.

(3) Multiple policy profiles with different QOS primitives, read-only, read-write, upgrade limits for each QOS primitives in enhanced certificates, and plurality of authentication methods that include 1 or more of:
    a. PKI Certificates,
    b. multi-step verification via independent paths,
    c. voice/speaker identification,
    d. SSO (Single Sign On), MFA (Multi-Factor Authentication),
    e. OAUTH or others (4) Enhanced Digital Certificate (eDC)—Metadata and Policy enhancements to the digital certificates, that include vendor id check for the transit NEs, virtual network elements, gateways, bridges, servers and other devices.

(5) Enhancements in transit Network Element (NE) for supporting secure network slices. Trust assurance of metadata and other policies are validated when eDCs are incorporated into the network element. Examples include providing information on eDC compliance of a plurality of virtual/physical elements (for example, virtual network layers, linecards and others) from SNS logical network either in-band or via control and management paths. Additional enhancements include the ability to determine the mirroring or replicating interface traffic that carries SNS traffic to an additional interface in addition to the destination interface for the traffic.

(6) Client prescriptive physical and network paths and network types that can ensure on request and in operation that the chosen routing transits only over communications systems technologies that are known and approved by the client. An example is a US Govt agency requiring "SNS can only use a dedicated connection path through allowed physical devices from Vendor A, manufactured in USA"

Having defined various embodiments, a detailed description follows. FIG. 1A is an example network infrastructure where the methods disclosed herein may be deployed. A multi-operator multi-domain network 100 may include client devices 101, end systems, Access Networks 102, such as wireless base stations, WiFi Access Points and others, and a core network 103. The Core Network 103 includes Accessibility and Mobility Management Function (AMF), Session Management Function (SMF), User Plane Function (UPF), Unified Data Management (UDF), Policy Control Function (PCF), Authentication Server Function (AUSF), Network Slice Selection Function (NSSF), SDN, Public/Private Clouds, Operator Core Networks (5G), and Physical or Virtual Servers (VNFs). Further, various services 104 may be connected to the network infrastructure, such as broadband service, voice call and text, low latency medical service, industrial IoT service, communication service and others.

Figure 1B:
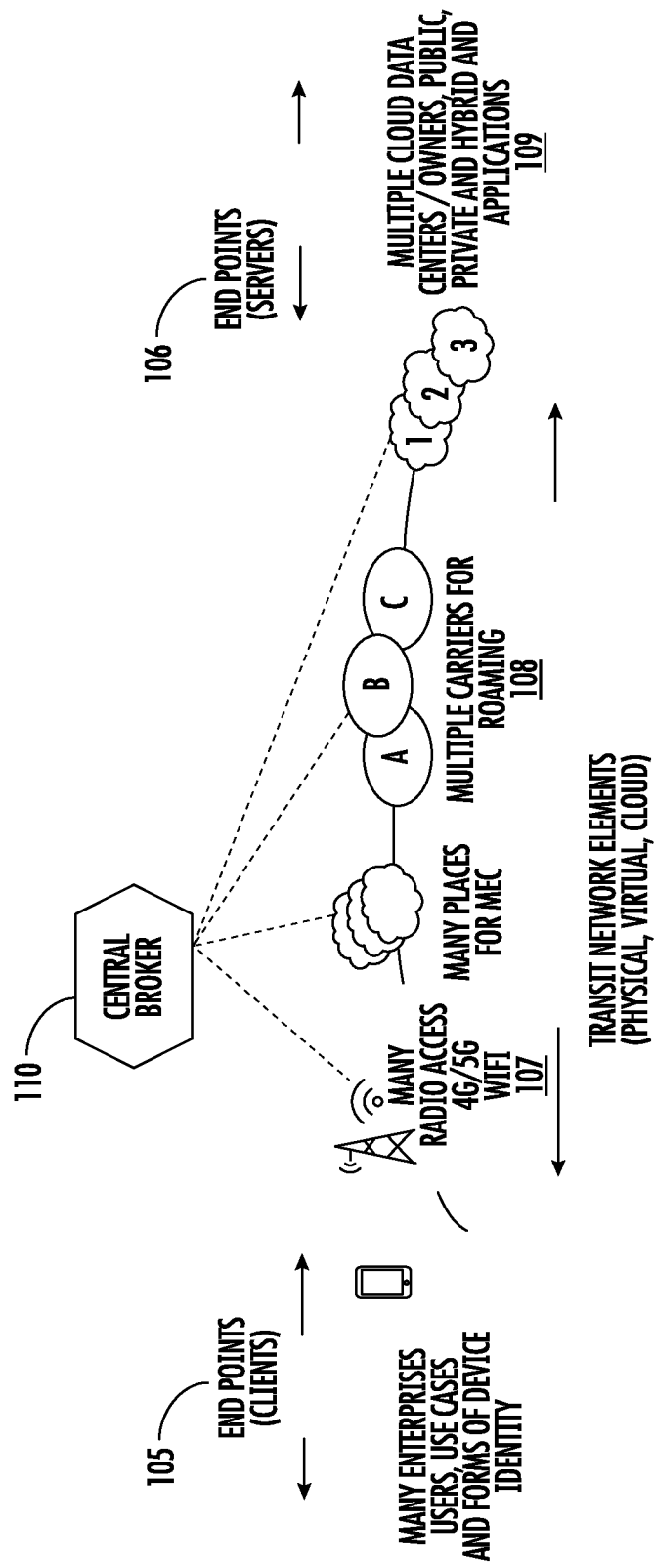
FIG. 1B is an example network infrastructure where the methods disclosed herein may be deployed, according to another embodiment.

FIG. 1B shows a second example network infrastructure where the methods disclosed herein may be deployed. In this embodiment, there are endpoints, which may be clients 105 or servers 106. Between these endpoints, there are a plurality of transit network elements. These transit network elements may include cellular infrastructure 107, such as 4G or 5G devices, multiple carriers 108 and cloud providers 109. In certain embodiments, a central broker 110 may be able to access each of these network elements. In this disclosure, the central broker 110 may also be referred to as an Operations Management Platform (OMP). In this figure, MEC refers to Mobile Edge Computing.

Each of the devices described above may be implemented as a hardware module. In some embodiments, this hardware module comprises a processing unit, in communication with a computer readable non-transistor storage medium. This storage medium may comprise instructions that enable the component to perform the functions described herein. In certain embodiments, two or more of the components described above may be incorporated into a single hardware module, and are implemented as software components.

The methods described herein facilitate creating, managing, monitoring, learning and auto-tuning Secure Network Slices that carry micro and macro application services in the evolving 5G Network Paradigm. Both the end devices and network partners will have certificates (specifically eDCs, which are X.509 Digital Certificates with the enhancements identified herein) on their devices, assigned by the enhanced Certificate Authority (eCA). The metadata of the enhanced digital certificate (eDC) dictates the provenance and other metadata attributes that are supported. The metadata includes, but not limited to:

(a) Hardware or Software Make
(b) Hardware or Software Model/Release
(c) Region where device is manufactured
(d) Location where device is manufactured
(e) Other Provenance Requirements
(f) Priority/Service Class
(g) QOS parameters (latency, bandwidth, reliability)
(h) Service duration
(i) Service criticality, redundancy and availability
(j) Network device type (Bridging, Switching, Routing, VXLAN, MPLS)
(k) Types of routing (Source Routing, Hop-by-hop routing)
(l) Hierarchy levels of network slices (sub-ordinate network slices with subset of QOS and Policies) for micro services. The subordinate slices may use different QCI levels within RAN with dedicated RABs for certain QOS levels.
(m) Device operation and Certificate type (User/Client, network edge, operator edge (connects two operator networks, and the operator names)

One such eDC is shown in FIG. 3. Of course, additional metadata may also be incorporated into the eDC, and the disclosure is not limited to only the listed metadata.

The metadata is intended to include both the Branded Device Model information, and the Original Manufacturer information that manufactured the brand; for example, Company A in China manufacturing products for NOKIA in USA. While the basic X.509 digital certificates with standard attributes are installed during manufacturing, different portions of the metadata extensions may be onboarded by the original manufacturer prior to shipment or onboarded post manufacturing at a reseller location, at an operator procurement site, or in device operational location in coordination with the trust assured entities. The method of onboarding the entirety or subset of the above metadata onto Digital Certificates at different stages before the device is put into operational use to carry SNS traffic is outside the scope of the current disclosure. However, the metadata extensions to X.509 certificates for enhanced security and trust and using these certificates for Secure Network Slices (logical networks with enhanced security and trust) are disclosed herein.

Figure 6:
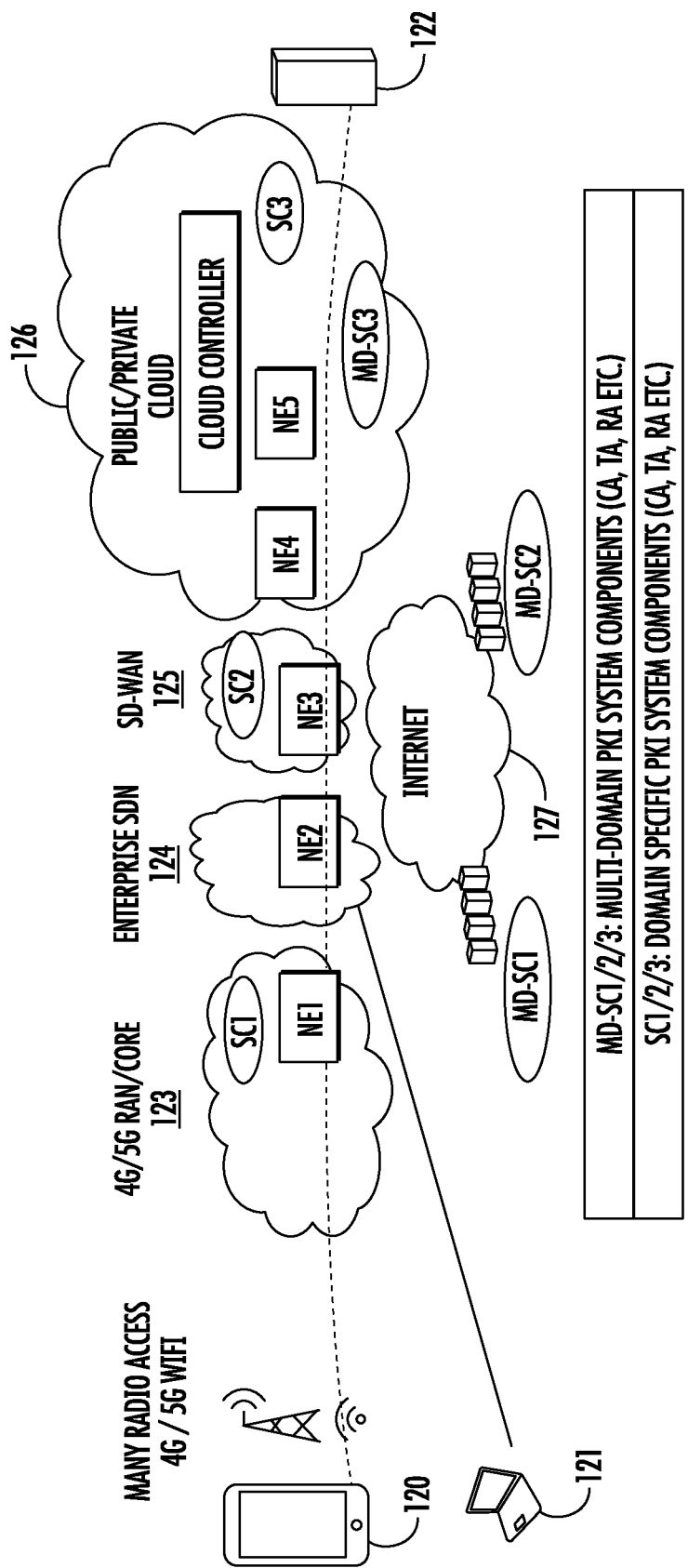
FIG. 6 shows the PKI infrastructure deployed according to one embodiment.

FIG. 6 shows the PKI infrastructure components that may be deployed to support the enhanced digital certificates. As noted above, the enhanced digital certificates comprise policy object identifiers to allow for end to end policies across a multi-domain network. The policies are specified for a plurality of security levels in the enhanced digital certificates as object identifiers. In this embodiment, there are clients, 120, 121 and a server 122. Between these devices is a 4G/5G RAN/Core 123, an enterprise SDN 124, an SD-WAN 125, and a public and/or private cloud 126. The internet 127 may also be accessible via this network. For simplicity, it is assumed that there is one network element (NE1) disposed in the 4G/5G RAN/Core 123, one network device (NE2) disposed in the enterprise SDN 124, one network device (NE3) disposed in the SD-WAN 125, and two network elements (NE4 and NE5) disposed in the public and/or private cloud 126. Certain network domains may contain their own Security System Components (CA, TA, RA and others). In FIG. 6, the 4G/5G RAN/Core 123, SD-WAN 125 and public and/or private cloud are shown as having domain specific PKI components, labels SC1, SC2 and SC3, respectively. Of course, more or fewer network domains may contain these domain specific components. Further, one or more multi-domain Security System components, labelled MD-SC1, MD-SC2 and MD-SC3 may also be disposed in the network, and these components may be accessible to multiple domains. The multi-domain security system components, labelled MD-SC1, MD-SC2, MD-SC3 support enhanced policies across the multi-domain network.

Figure 10:
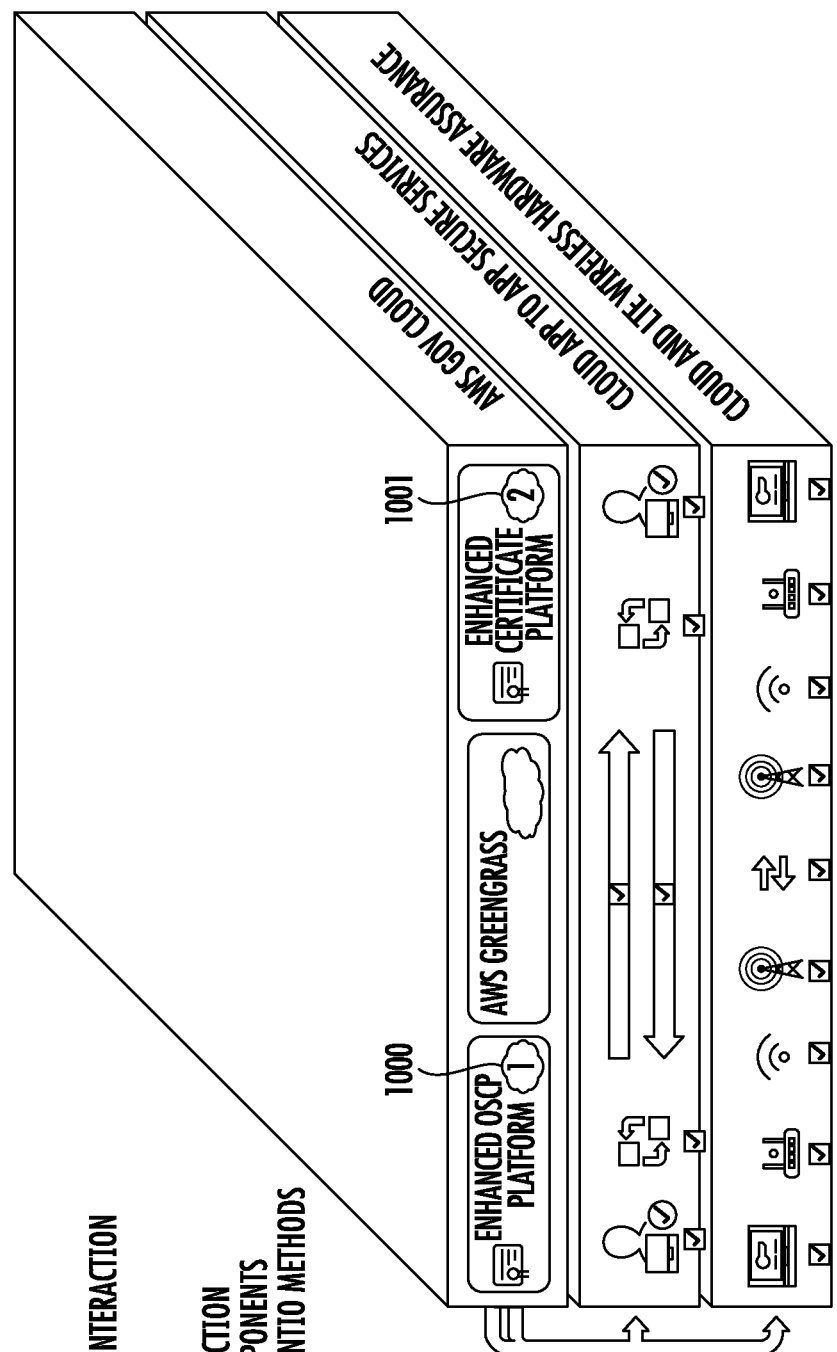
FIG. 10 shows an example deployment configuration with the end to end Multi-domain security system components in an Amazon AWS Cloud Environment, which may be an example of a multi-domain security component shown in FIG. 6.

The policies are specified as object identifiers in eDCs. FIG. 6 shows MD-SC1 and MD-SC2 located in secure locations, and MD-SC3 as a virtual system deployed in Cloud. The multi-domain security components include Enhanced CA (eCA), enhanced OCSP Server, enhanced OCSP proxy and others that are involved in the life-cycle of eDCs. FIG. 10 shows an example showing OCSP Server/Proxy in the AMAZON AWS.

Specifically, FIG. 10 is an example deployment configuration with the end to end Multi-domain security system components that support the methods disclosed herein in an Amazon AWS Cloud Environment. The OCSP Platform 1000 and the Certificate Platform 1001 shown are software modules (VNFs) that use the methods disclosed herein and use infrastructure HW and SW services. These platforms work in coordination with the Multi-Domain Security System components in physically secure locations. The OCSP Platform 1000 and the Certificate platform 1001 maintain shadow copies of certificate related information such as revocation, validity periods and other parameters, to reduce end to end round trips for certificate retrieval and validations to achieve "Near Zero Latency (NZL)". Using Analytics/Learning Algorithms and opportunistic shadow copying using underlying OS to locate certificate data close to the endpoints that use the specific certificates, these platforms reduce round trips and latency. These shadow copies may be managed by the OCSP proxy methods within the OCSP Platform 1000 and the Certificate platform 1001 shown in the figure.

In certain embodiments, security system components such as the Certificate Authority (CA), the OCSP Server/Proxy and others, may be enhanced to support the disclosed methods. The term "eCA" refers to enhanced Certificate Authority that validates identify of requester, either end user, a business entity or an intermediary, such as a IOT Gateway, and issues eDCs. Furthermore, these enhancements may include assuring, validating and trust assurance that the subject identified in the enhanced certificate meets metadata attributes such as manufacture location, region and others. This validation may be by the OEM or assembly location or at a service provider procurement location by interaction with the trust assured systems at the manufacturing or assembly locations. For example, all of the physical or virtual devices or software modules that are involved in setting up or using a SNS may require trust assurance via eCAs.

Although not shown, each network domain and cloud operator uses its own Network Controller and Element Management System (EMS). The end to end multi-domain security infrastructure defined herein uses its own Controller/Orchestrator (see Central Broker 110 in FIG. 1B) to interact with each domain and cloud controller, ONAP, or Element management systems in order to set up the "Secure Network Slices". In this way, it is able to determine the compliant transit network devices.

The policies required for a network slice are dependent on the specific application or service, and endpoints that use the network path. For example, an IOT Gateway that uses 5G Mobile network as an uplink that services several healthcare IOT devices in an assisted living facility may require periodic reporting to a healthcare provider and may need high bandwidth connectivity to local health care provider (hair pinning at the edge) during emergencies. A network slice that supports streaming service from a stadium via 5G network requires high bandwidth transport to plurality of application servers during an event at the stadium.

Additionally, for supporting network slices at multiple security levels (for example, Low, Medium, High), policy requirements for each level may be different. For example, a network slice with SL2 security level may require nailed down transit paths through each device, maximum BW, exclusive interface use, no mirroring/replication at interfaces, and source routing or static routing instead of hop-by-hop routing, minimal time of presence in the transit network to minimize security vulnerabilities and other constraints. Additional polices for SL3 flows may include limiting the active duration of slice or data flow through the slice without revalidation of security policies, allowing only certain P2P protocols, not using alternative path or pre-validated path only when an interface goes down and other constraints to minimize security compromises. The security policies listed above are example policies; specific use cases may require other policies.

Network elements that support the security policies described herein are validated by testing in a test environment with specific vendor's device models and software versions. The enhanced digital certificates are issued by offline or online methods. The methods of obtaining a certificate are well known and are not described in this disclosure. Enhanced certificates are incorporated into these devices via offline or online methods prior to dataflow through the network slices.

Additionally, the network element is required to support configuring particular interfaces via management and configuration methods by identifying the next hop devices that they connect to. The interface is marked with a security level (such as SL1, SL2, SL3 and others) based on policies to which they are compliant. In each transit network domain, all possible forwarding paths from one network-domain endpoint to the next network domain endpoint are determined, and each transit device and its ports may be marked with Security level. This process is continued across all the domains in the multi-domain network from each of the multi-domain network end points. For example, this process is performed at enterprise locations that connects to the multi-domain network at multiple geographical locations.

While setting a transit path, which may be done either via routing protocols or by configuring transit network forwarding paths using a domain controller, only interfaces/ports that are marked with the corresponding security level are used. If the network slice operates at L2 protocols, only compliant interfaces/ports are enabled to the forwarding state. If the multi-domain network contains virtual networks/VNFs, the same process is used for these elements.

The network elements (transit or endpoint) may be a chassis with pluggable line-cards (hardware modules) from different vendors. While selecting a NE as compliant with one or more levels of security, the validation method needs to ensure that specific line cards are compliant with the security policies (for example, the line-card is not from prohibited vendors identified in the enhanced digital certificate) and may use per linecard certificates.

While the setup of SNS's may be performed using a central broker 110, the network elements in the path may also play a role. For example, a Physical/Virtual Network element, referred to NE-A, may, before transmitting on a physical/virtual/cloud network interface or a network slice or TCP/UDP session, to a second network element, referred to as NE-B, validate that NE-B has a digital certificate with the needed policies to receive data from NE-A and that it supports the policies per the certificate.

Further, a compliant NE-B that is intended to receive network flows from NE-A in turn validates the authenticity of NE-A, before processing flows. While processing flows, if NE-B needs to transmit the data (forwarding or after flows processed by local applications) to plurality of outbound interfaces, it performs the steps described above with respect to NE-A.

On the other hand, NE-B may be a consumer of the data flows from NE-A. For example, NE-B may be a database server, or protocol/application proxy etc. in the enterprise physical or virtual network or a VNF. In this embodiment, NE-B is processing a received request, the requested data in NE-B may require a different set of security on who/which system/client could request and what the transit NEs should assure. In other words, data traversal in the reverse direction may require revalidation similar to the above steps. In such a case, the responding network element may reject the request, indicating insufficient security policy, thus causing the originator to move to a higher level of network slice or orchestrate the reverse flows to use a higher level of network slice. As an example, a request for data may be made to a database server using a SNS having a first security level. When the database server obtains the requested data, it may discover that this data may only be transmitted using an SNS having a higher security level. In this case, the database server will reject the request and indicate that the request must be made using a higher security level.

It is noted that at boundaries between networks, for example, from enterprise SDN 124 to SD-WAN 125 or cloud provider 126, as shown in FIG. 6, the provider may not provide visibility to internal physical or virtual network elements. In such cases, the security policies may require performing the above steps at these boundaries.

In this way, data integrity, security certificate validation is achieved at each physical or virtual hop and termination point in the path of network slice. This includes AWS, EPC, and other service provider networks. In other words, all systems along the flow path may provide repudiated slice integrity to flows.

In certain embodiments, the network elements may label their interfaces based on the security level. For example, for Security Level 1 (SL1), which is the default, low security level, the network elements may follow the usual destination forwarding /L2/L3 rules. However, the network element may determine that, in the paths, no NE will be from Vendors "X", "Y", or "Z". Thus, an enabled NE may mark each interface as "SL1", depending on to which device it connects. If the interface connects to a device from vendors "X/Y/Z", it will not be marked as SL1. In all the devices that have the enhanced Digital Certificate, all the ports marked "SL1" would be an "eligible port group" for any L2/L3 Forwarding.

A medium level, referred to as Security Level 2 (SL2), may include everything contained within SL1, but may disable port mirroring and flooding, for example.

A high level, referred to as Security Level 3 (SL3), may include everything contained within SL2, but force nailed down routing, such that upon interface failures, the traffic will not be rerouted. Additionally, the device may verify the path at the start of a new flow.

Of course, the description above is purely illustrative and the security levels may be defined differently.

In the edge device, such as the CPE at an enterprise location that interfaces to the CSP that connects to the slice, the device will have a certificate for each slice (Slice Certificate) indicating the slice requirements. For example, the R&D dept in an enterprise may require higher security level (SL3) than Customer Service (SL1). Thus, the eDC for SL3 may require only Vendor A device and Safari Browser only, and SL1 may allow devices from Vendors A,B,C, and Safari and Chrome. In the enterprise location, the Authentication/Authorization server validates user device, user access profile, user department, and determines the which security level slice to connect to.

3GPP Standards define network slices in 4G/5G networks with QOS parameters for wide variety of applications and micro-services (such as IOT, M2M, Vehicular Communication, voice, internet, video and others). The present disclosure describes using different security levels and associated assurances in addition to the QOS parameters. For example, SL1 (Low Security Slice) may use the default bearer in 4G/5G Network, and SL2/SL3 may use dedicated bearers. A wireless mobile operator or MVNO that offers these security assured services may use dedicated bearers with different QCI and protect that traffic via a dedicated user plane GTP-U tunnel while carrying the traffic through the mobile network. For example, each secure network slice may terminate in a different APN in mobile core network.

In certain embodiments, one or more mCAs maybe employed. The term "mCA" refers to a Mobile Native Certificate Authority which incorporates the methods described herein. The mCA incorporates Control Plane and User Plane protocols and procedures to operate in mobile network to minimize latencies. This may be a new hardware module that incorporates subset of the methods described herein or a software module that is installed on commodity hardware platforms with layered software (Host OS, Virtualization Software, Containers etc.) or in Public/Private Clouds. Specifically, the UP protocols use GTP-U tunnels where user IP packets are encapsulated in transport layer IP packets. The transit network may selectively forward flows targeted to mCA or mCA may recognize and process flows targeted to itself, terminate GTP-U tunnels, extract user IP packets, and respond to user requests. Other security system components such as OCSP Server or Proxy OCSP server, may selectively extract user IP packets from encapsulated GTP-U tunnels and process the targeted flows.

The process of connecting a mobile device to a secure slice is described below.

First, the mobile device connects to operator network in the control plane. The operator allows this connection based on recognizing user and user device, based on authorization and authentication, which may be performed using IMSI, IMEI. In other words, the eDC may not be used at this time.

This is essential for establishing any UP/GTP-U tunnels. The user then requests to setup UP/GTP-U tunnels for a specific application, wherein the QOS is specified while connecting. The user also specifies APN. The APN could be different for different security levels.

After the GTP-U tunnel is established, all the user data from that application (both eCA data and other slice traffic) travels through this tunnel.

In prior art environments, the security platform components such as the CA, OCSP Server, OCSP Proxy and others that participate in authentication of user plane sessions, are not in the mobile network, and are beyond the PGW. In other words, these components do not process userplane traffic in tunnels. Thus, the PGW terminates GTP-U Tunnels, and forwards user IP payload to Internet or other targeted systems. Thus, in prior art systems, the CA processes user IP packets and not GTP-U tunneled packets. This will have path latency to PGW, and in that the CA is not in mobile network, either the radio network or the core network.

Thus, in one embodiment, security platform components such as eCA, OCSP Server, OCSP Proxy and others, are disposed in the mobile network. Placing an eCA or eCA network in mobile network may require terminating GTP-U tunnels for that user and processing all user IP flows—(this happens in Mobile Edge Computing(MEC), where the virtual PGW terminates entire GTP-U tunnels), and would have to do various proxy and forwarding functions for sessions it cannot process.

Alternatively, from the GTP-U tunnels of a user, only flows targeted at security platforms such as the eCA are forwarded by the underlying network, and the enhanced security platform terminates the GTP-U tunnels and processes flows targeted to itself. Network devices such as DPI (Deep Packet Inspection) Boxes, or network element with deep packet look up based selective filtering, forwarding or replicating capabilities, or a SIPTO (Selective IP Traffic Offloading) device in operator networks perform these forwarding operations. Similar to eCA, other enhanced security system components, such as OCSP Server or Proxy that maintains certificate expirations, revocation lists and other items, could terminate GTP U tunnels and process received flows.

The policies of a network slice may allow setting up hierarchical slices, in the sense that for a new slice QOS, the policies, such as security policies, may be within the scope of previously set up slice. For example, a network slice setup to an Assisted living facility may support plurality of services, such as Video Streaming, Internet, Messaging for carrying IOT traffic from medical IOT devices. An IOT gateway may initiate a periodic and/or a need-based network slice with associated QOS and policy parameters. The underlying plurality of networks (WIFI, LTE, LTE-M, LTE-NB, Wireline, cloud and others) may use the network paths most appropriate for such service.

Slice selection may be performed in a number of ways. When an enterprise location that uses an edge network element, such as a CPE router, Firewall or other device, to access multiple secure network slices, each slice with a particular security level forms a virtual network. If the enterprise location has multiple departments, each department may require a different security level, map to a different subnet, and use a specific slice through the virtual network. Traffic from a client device in that organization goes through the network slice with the associated security level. Alternatively, specific network slice selection may be driven by a client device or client application selecting a slice with specific security level while opening an application session. The slice selection may use additional validation techniques such as Multi-factor authentication, EAP, CAPTCHA and others.

Alternatively, instead of setting up network slices with multiple security levels before use, a client device using a default or low security level slice, may trigger to set up a new slice with higher security level, in a manner similar to creating dedicated bearers in mobile networks (UMTS, LTE), or in setting up VPNs. It is envisioned that transit network domains (Carrier, SDN-WAN, Cloud and others) need to provide different guarantees and framework for different security levels and charge higher tariffs based on security level, use-time, latency and bandwidth. Applications may use higher security level slices only when needed to minimize costs.

In other words, it is envisioned, that policy assurance for different security levels may require different resource levels, prioritization, validation, and network service providers may charge differently for different security levels. Thus, clients of a specific network slice may minimize the use of high security level only for critical data transfers; for example, for backup or replication of sensitive data from server in one location to another for protection, or to minimize access latencies.

While setting up sessions through secure network slices, the network endpoints of the network slices may validate that the clients and servers that use the network slice are at the required security level for that slice. The method of validation may be via the client and server IP Addresses, authentication mechanisms (such as EAP), determining the departments they belong to, user and client authentication via multi-factor authentication, captcha tests and other techniques.

In certain embodiments, path validation while setting up a secure network slice or during use may be via control/management planes by interacting with domain's PSF/VSF systems, ONAP, service providers Control and Management systems or in-band via extensions to protocols such as TLS. This validation may be done on a hop by hop basis so that every segment in the transit multi-domain network (MDN) is compliant with certificate policies.

In summary, network elements, such as switches, routers, bridges, SDN Devices, Virtual Network Elements and others, in the transit multi-domain network may contain their own vendor unique digital certificates. Additionally, if the device is a chassis with pluggable linecards, the linecards may contain their own vendor unique certificates.

This disclosure describes the incorporation of vendor independent enhanced digital certificates with enhancements for Secure Network Slices to create compliant devices and linecards in coordination with the vendor at factory or at operator procurement or enterprise deployment locations.

Figure 7:
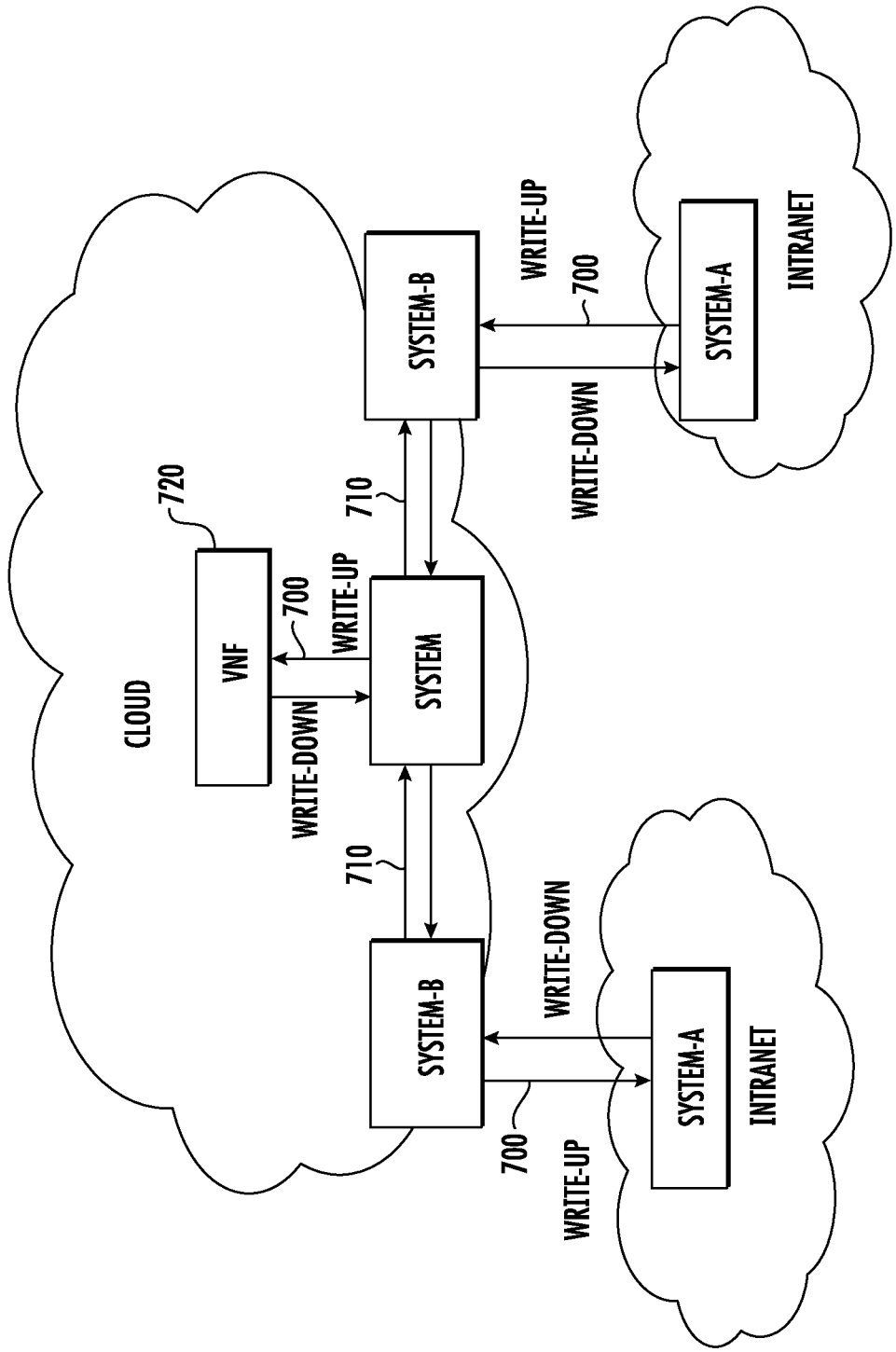
FIG. 7 shows network dataflows of network slices through multiple network domains.

FIG. 7 shows network dataflows of network slices through multiple systems. The policies required per particular security level in an enhanced Digital Certificate may be different on North/South interfaces 700 that connect the network edge to the MDN Network and East/West interfaces 710 that connect the network elements in the transit network. FIG. 7 also shows Application Servers (VNFs) 720 such as Web/Mail/Database servers, in the cloud that terminate flows connecting to North/South interfaces 700. As stated above, the metadata attributes and the associated security level required may be different for different flow directions, such as East/West directions 710 on packet forwarding NEs and North/South interfaces 700 that process at higher levels up to application level as in Servers and Proxies.

Figure 5:
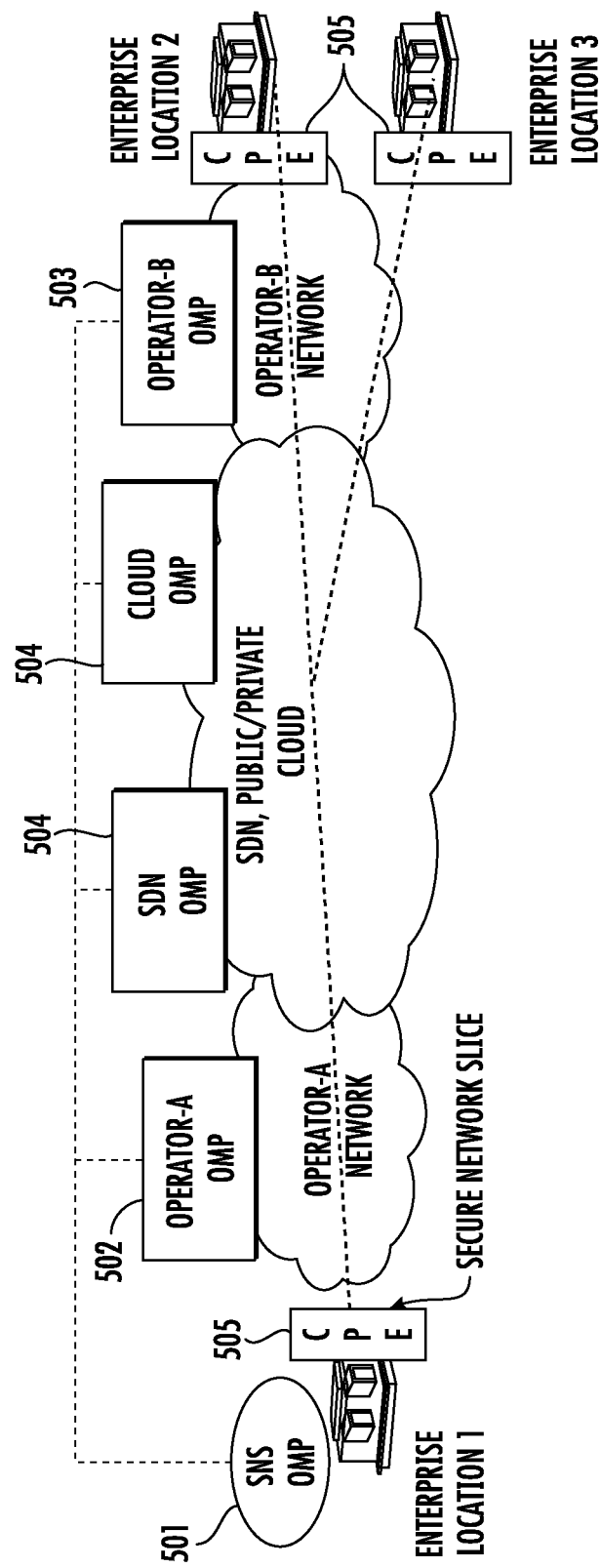
FIG. 5 shows an example deployment of a SNS Operations and Management Platform (SNS-OMP) in a multidomain network interacting with network controllers of each domain.

The transit network between multiple locations of an enterprise that requires high security may include multiple service providers, virtual networks, cloud networks, and each such network contains multiple domains, physical and virtual network elements, as shown in FIGS. 1B, 5 and 6. Additionally, the physical/virtual elements in the multi-domain network may include application services (Hypervisors, VMs, Containers, Servers, VNFs). Thus, the present disclosure describes Digital Certificate enhancements with object identifiers for plurality of security levels with metadata for all of these transit Network elements (physical, Virtual, Cloud, VMs, Hypervisors, Containers, VNFs, Endpoints Client Devices, Client Applications, Servers, proxies, VNFs). Further, the present disclosure ensures that each network element holds the certificates with required security level for secure traffic in each direction (North/South, East/West).

The certificate enhancements may be dependent on the type of physical or virtual network elements, interface type (North/South, East/West), security level and other parameters. This approach allows integration at the OEM supply chain, the acquisition process where one carrier acquires another carrier's assets, or even an Enterprise that wishes to harness a variety of network platforms to obtain end-to-end service.

While selecting a transit network device for inclusion in the path, each of the network devices, and the linecards that may carry the secure network slice traffic need to be assured that they hold the enhanced security certificates. The robotic process assurance using enhanced certificates may be achieved, for example, by identifying all the transit IP addresses between the slice termination points (edge network elements) by utilities such as "trace route-all", determining that each device corresponding to that IP address (chassis) holds the enhanced certificate, checking each transit forwarding element (L2 forwarding switch/Bridge, MPLS switch etc.) between two Layer 3 devices and then checking which linecards hold the enhanced certificate for inclusion in the secure slice path. Additionally, for inclusion of a network interface for slice traffic, the next hop connected device and the associated linecard need to be checked that they hold the enhanced certificate. The process of checking that each device and the plugged linecards hold the enhanced certificates, and are compliant with security policies may be achieved using the corresponding Physical/Virtual Control, Management, Security platforms (PSF/VSF) or EMS, ONAP, and/or management protocols. This process needs to be repeated across all transit network devices hop by hop, and the corresponding interfaces marked as eligible. Additionally, since the linecards may be hot-swappable, and cable connections between the devices may be changed by service personnel, a subset of the process needs to be performed when an interface comes up, or after hot-swap of a linecard or device reboot, or when a virtual service is moved from one underlying physical or virtual component (HW, VM, Container) or expanded/distributed for redundancy, backup, or for increased load.

As noted above, FIG. 1B discloses a Central Broker 110. The central broker 110 is used in combination with security system components such as the CA, the TA, the RA, and others in the multi-domain network. The central broker 110 understands the enhanced policies; manages certificate validation; manages operations using Shadowing/Mirroring etc., and manages features using physical or virtual/cloud elements distributed in the network to minimize round trips and end to end latency.

This central broker 110 may be implanted in a number of ways.

For example, the central broker 110 may be a SNS-OMP 501 (Secure Network Slice Operations and Management Platform), as shown in FIG. 5. In this embodiment, the SNS-OMP 501 sets up network slices either from user initiated requests or enterprise or operator initiated requests. The SNS-OMP 501 discovers the available networks of plurality of service providers, determines transit forwarding paths from each of the service provider networks, determines attributes of each network element (Manufacturer Name, Model Number, Software Version etc.), and determines compliant network elements (Network Elements that support the policy requirements). This may include interacting with a controller 502 in Operator Network A, a controller 503 in Operator Network B, and controllers 504 in the cloud networks through which the secure network slice traffic traverses.

The central broker 110 (which may be SNS-OMP 501) identifies additional constraints based on the metadata in the enhanced digital certificate while using source routing or hop by hop routing or L2 forwarding during setup of network slices so that malicious network elements or virtual network functions do not compromise security. The transit network paths may use Layer 2 or combination of Layer 2 and Layer 3 segments. In layer 2 devices, only interfaces that connect to compliant next hop devices are selected as eligible ports.

The following illustrates several embodiments by which a secure network slice may be established. Reference is made to FIG. 5.

In one embodiment, an enterprise that requires SNS paths to its multiple geographical locations uses a central broker 110, such as SNS-OMP 501 that interacts with service provider Operation Management Platforms (OMPs) such as OSS/EMS, ONAP to determine transit network elements, and queries each device to identify devices that hold eDCs. The OMP is a logical entity that includes one or more servers, such as authorization and authentication servers, such as RADIUS, DIAMETER, policy server and others that validate user access privileges, authorize user devices and perform other functions. Each Service Provider OMP via APIs provides methods to determine their network interconnect topology, routing and forwarding paths, and to mark, and configure routing paths (for example, static routes). SNS-OMP 501 uses client applications (such as ONAP Clients) to interact with these operator OMPs.

FIG. 5 shows an example network that illustrates SNS setup. The CPEs 505 shown are customer premise devices that connect the enterprise network to one or more communication service providers, for example, COMCAST, Verizon, ATT etc. The dotted lines in the figure show logical control and management paths between the SNS-OMP 501 and service provider OMPs.

Figure 8:
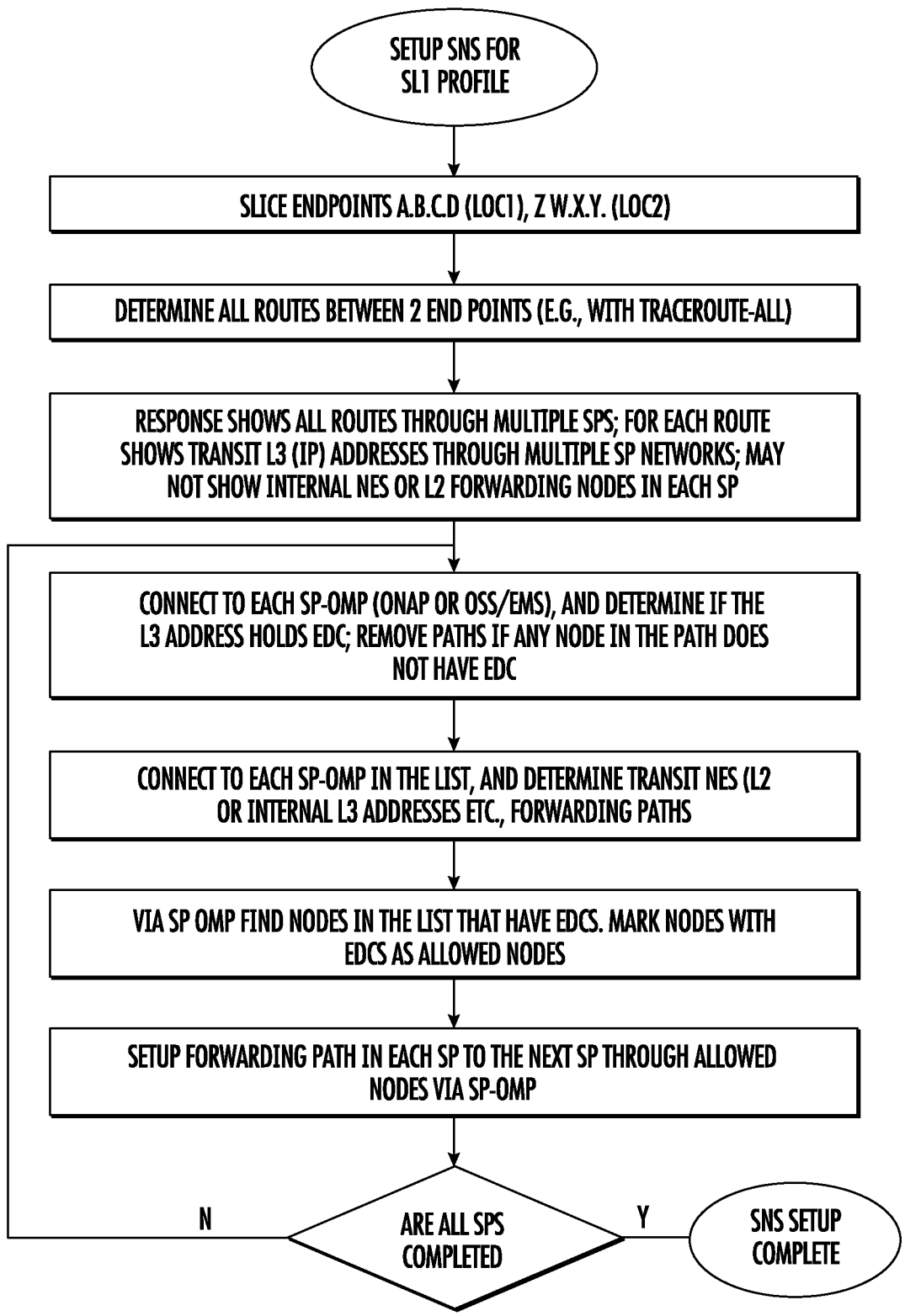
FIG. 8 shows a flowchart showing the creation of a secure network slice.

The following steps illustrate setting up SNS logical network according to a first embodiment. The steps are illustrated in FIG. 8.

In certain embodiments, the enterprise requires 3 different security levels (SL1, SL2, SL3 where SL3 is highest security level), for 3 different departments, such as Sales, Customer Service, and Engineering. In this example, the security policy requires only Nokia ND1 models with software version V10 for SL3, and ND1 devices from Nokia, or CD1 from CISCO, or ED1 from Ericsson are allowed for SL3 traffic.

The Enterprise may purchase network services from Access Network Service Providers, such as Operator-A Network, and Operator-B Network, SDN and public/private clouds, for network and hosting services (Application servers, Database Servers, caching and proxy servers). As part of the service, the enterprise negotiates access to each of the service provider's OMP (OSS/EMS, ONAP etc.). The Access Network Provider provides one or more IP addresses for forwarding traffic to/from enterprise locations. These addresses terminate in the CPEs 505 in enterprise locations. Thus, SNS paths terminate in the CPEs 505 similar to CPE deployments in prior-art deployments.

For setting up the SNS at security level SL1, SNS-OMP 501 uses "traceroute all", to determine all possible paths from local CPE to remote CPE. The "traceroute all" response includes transit IP addresses within multiple SP networks in the transit network. The forwarding (L2 or L3, MPLs etc.) paths through internal network elements within each service provider's internal network may be unknown from the responses.

From the "traceroute all" responses, the SNS-OMP 501 identifies transit L3 routing element addresses that correspond to L3 routing NEs in multiple SPs. The SNS-OMP 501 interacts with each SP OMP 502, 503, 504 to determine the network elements that terminate the addresses, and whether the devices hold eDCs, and verify each device and/or virtual entity is trust compliant. The SNS-OMP 501 marks only those devices that have eDCs as allowed devices to carry SL3 traffic.

Corresponding to each transit and the next hop IP addresses, the SNS-OMP 501 queries the corresponding SP OMP to determine transit nodes (L2, L3 etc.) between the two addresses. The SP OMP or the SNS-OMP 501 in cooperation with SP OMP could use "traceroute all", LLDP, SNMP or other protocols to determine transit nodes.

In the previous steps, the SNS-OMP 501 identifies all the transit devices that are allowed to carry SNS SL3 traffic.

The SNS-OMP 501 then interacts with each SP OMP to setup static L3 route, L2 or other forwarding paths in its network up to the entry point in neighboring SP Network.

As an alternative to setting up a static route in each service provider network, the SNS-OMP 501 in cooperation with SP OMP configures next hop links through allowed devices of each transit SP network.

The following steps illustrate setting up SNS logical network according to a second embodiment. In this example, the transit SPs set up a SNS in their own networks, and make compliant transit route maps visible to the SNS-OMP 501, thus not providing support to set up transit paths or visibility to all of the network elements in their network. This facilitates the client enterprise to access and validate physical and network paths already setup by the SP, thus isolating SNS's of multiple enterprises.

In this embodiment, the Enterprise uses SNS-OMP 501 as shown in FIG. 5 at one or more operations centers which interacts with SP OMPs using APIs to ONAP, NETCONF, SNMP and other protocols. Additionally, the SNS-OMP 501 validates user and device authentication/authorization and security level for specific departments when application sessions are initiated through CPE 505 for using SNS paths.

For setting up a SNS at a specific security level (e.g., SL3), the SNS-OMP 501 determines entry point address (e.g., default gateway a.b.c.d) in the access network.

The SNS-OMP 501 then determines transit L3 routes from local CPE 505 to destination CPE 505 or Physical/Virtual server in the cloud to determine a plurality of transit forwarding paths through multiple service providers by commands such as "traceroute -all" which returns multiple routes to destination and transit L3 addresses on each route. However, such response does not include L2 switch/bridges between two L3 nodes. L3 addresses in each routing path facilitate determining transit networks.

The SNS-OMP 501 then connects to each OMP corresponding to each SP identified above to find transit NEs in each SP network. In coordination with the SP OMP, only trust assured paths (NEs with eDCs) are marked as allowed for the specific SNS.

In coordination with OMPs of transit SPs, the SNS-OMP 501 orchestrates redundant paths, in each SP network and at the SP boundaries. For example, at one location, there may be 2 CSPs providing network connectivity to next SP networks or Cloud. Setting up multiple network paths for redundancy and availability is well known in the prior art. While setting up such paths, the SNS-OMP 501 ensures such alternate paths include only allowed network elements (with eDCs).

The enterprise also negotiates with each transit SP for automatically notifying the SNS-OMP 501 of any link or network element failures, for example via SNMP traps.

Thus, in this embodiment, the SNS-OMP 501 effectively stitches together a complete Secure Network Slice based on partial secure slices that are provided by the OMP of each service provider.

Upon receiving path failure notification, the SNS-OMP 501 selects the alternative path learned above, revalidates trust compliance and orchestrates using alternate path via the respective SP OMPs.

The following steps illustrate setting up SNS logical network according to a third embodiment. In this embodiment, the SNS-OMP 501 interacts with Access Network CSPs to determine physical or virtual network paths to determine entry and exit paths to/from access network to next segment providers from one enterprise location to other. For example, if Operator-A network offers connectivity to the SDN, the operator-A OMP 502 provides alternative paths (corresponding network element identities or addresses), so that the SNS-OMP 501 could determine or orchestrate transit path to alternate SDN entry points.

Starting with the first entry point device that connects to CPE 505 at the first enterprise location, the SNS-OMP 501 determines which devices hold eDC by interacting with the Operator-A network OMP 502. The SNS-OMP 501 marks each physical or logical interface between the CPE 505 and allowed Operator-A network entry-point device as "allowed" for that security level, for example SL1.

The SNS-OMP 501 then traverses physical or virtual interface paths from the allowed entry-point device through each connected physical or logical interface to determine if the connected device holds an eDC. If the connected device holds the eDC with the specific metadata attributes, it marks the interface as "SL1-Allowed". This step is performed through all the devices between the entry point to the exit points from CSP1 to the entry points of the next segment provider, for example SDN1.

The SNS-OMP 501 performs the above steps to mark all interfaces as "SL1-Allowed" if the device itself and the device the interface connects to holds eDC. This process marks eligible interfaces as "SL1-Allowed" in each transit service provider network.

The SNS-OMP 501, in coordination with SP OMP in each transit network, may create a unique VLAN Tag for the SL1-Allowed interfaces, so that L2 VLAN methods use only those ports.

The SNS-OMP 501, in coordination with SP OMP in each transit network, may create a virtual interface and logical IP subnet on each of the SL1-Allowed interfaces, so that forwarding paths to the destination enterprise endpoints may be specified through these logical interfaces.

The following steps illustrate setting up SNS logical network according to a fourth embodiment. An Access Network provider, such as VERIZON or ATT, may offer managed SNS service at multiple security and service levels (SL1, SL2, SL3), performing the SNS setup end to end, providing only trust validation methods via APIs to its OMP. This service is similar to VPN services offered by CSPs with the difference that VPN services use end to end encryption at the two end points without trust assurance of each network element that carries the VPN traffic. SNS setup may be achieved by CSP1 using SNS-OMP as in the previous examples. The CPE (or virtual CPE) that connects to the network at enterprise location terminates the SNS.

Of course, these are illustrative examples and the disclosure is not limited to only these embodiments.

The following are some example profiles that are enabled by the present disclosure.

In the Open Network Automation Platform (ONAP) environment, the network slice selection policies (NSSP) would be dictated primarily by this profile.

In one profile, communication over the partner's network is only routed through equipment sourced to friendly country suppliers. In other words, the security level may require equipment only from a select group of countries. For example, this would NOT allow traffic to be routed over equipment or software that is unfriendly to the country's strategic interests. Only validated and trusted equipment are allowed in the traffic paths.

In another profile, communication over the partner's network is only routed through equipment that is made in a particular country, such as the United States.

Figure 4:
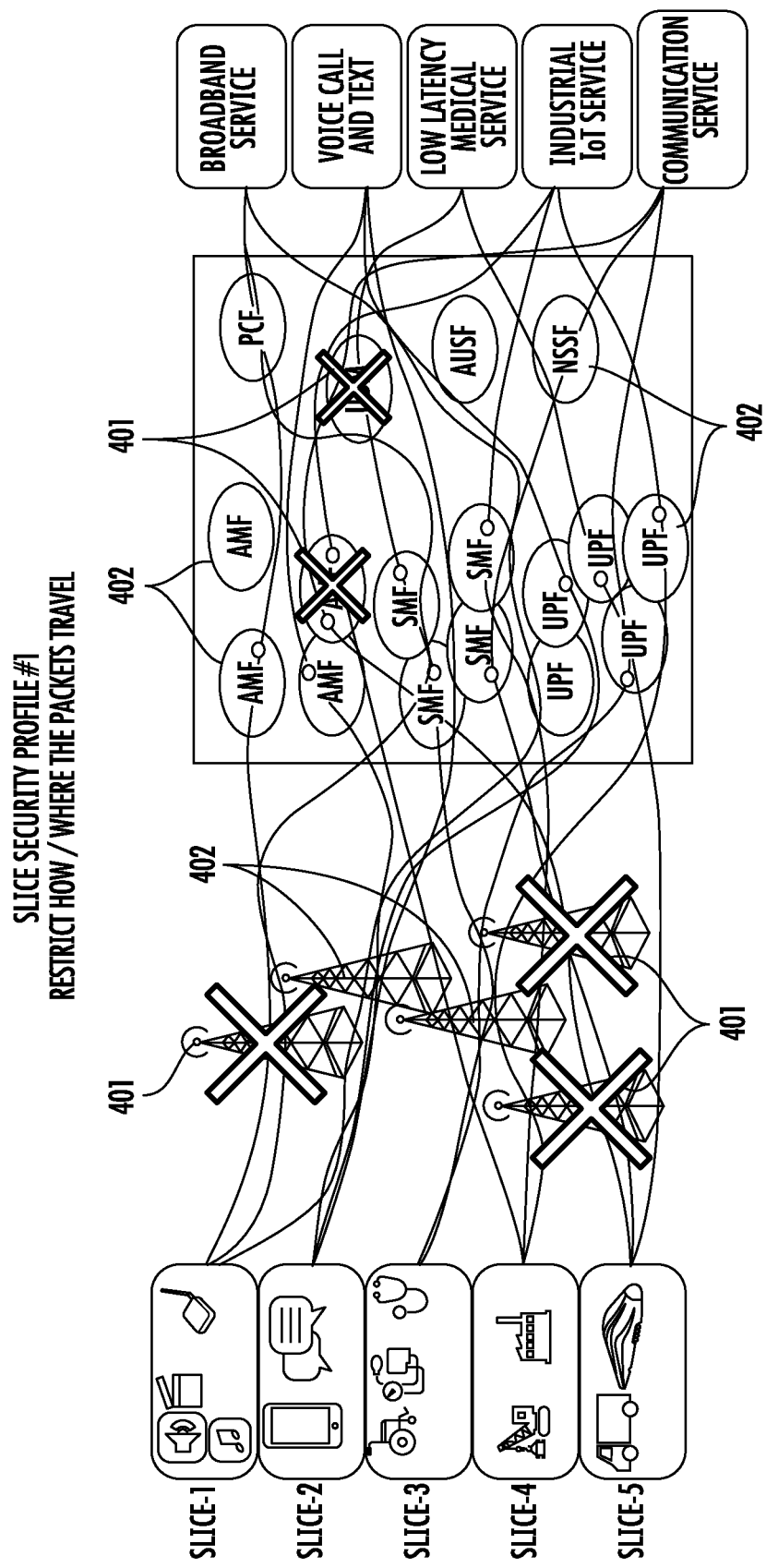
FIG. 4 shows the configuration of a secure network slice according to one embodiment.

As an example, FIG. 4 shows allowed and dis-allowed transit paths for a Secure Network Slice with a specific profile, according to one embodiment. Certain transit network elements 401 do not hold the eDCs. For example, these network elements may not be from a qualified vendor or may not be manufactured in an allowed region. They are marked with "X" indicating those network elements 401 are not allowed to carry the specific SNS traffic. The authorized network elements 402 hold an eDC that supports the policies for that particular slice and are allowed to carry SNS traffic.

While network paths are normally determined by routing, bridging algorithms, or by a network Controller/Management Platform based on QOS, the present disclosure uses additional constraints for assuring security and trust. The users or enterprises that use the network slice could dictate which vendors, models, software versions, transit virtual networks, cloud frameworks, geographical locations etc., that they trust.

The following example shows the steps undertaken to set up a network path.

First, a client device, such as a mobile/IoT device, needs a connection to "somewhere" past a wireless AP or 5G RAN. The user or operator selects a profile (which would dictate which certificate will be acceptable) or the device or the application of the device is "hard-coded" for a specific profile.

Next, the client device authenticates to first hop (WiFi or 5G RAN) that it holds the required eDC. While allowing the service, for example, the control plane (CP) connection to the operator network, and/or allowing user plane (UP) tunnel to a secure APN/PGW, the operator network authenticates the user device and authorizes user credentials. This authentication may check, for example, a specific manufacturer of a mobile phone, the version of the phone, the software revision or other parameters. This may be done using an EAP-TLS RADIUS server for WiFi or DIAMETER for a 5G RAN.

The mutual Transport Layer Security (TLS) allows the client device to also ensure the host has the proper profile metadata, meaning it can support the requested SLA (Service Level Agreement).

The device may also authenticate, using the same certificates, to web-based clients using OAuth2 mechanisms, which are industry standard protocols for authentication.

The backend infrastructure selects the proper traffic route based upon profile specified in enhanced digital certificate. For example, when a user device or an application in an enterprise location initiates network connectivity to a remote server through CPE, the CPE validates the authenticity of the user device and the security level from the device certificate and uses the SNS at that security level for the corresponding route.

Specifically, the backend infrastructure does one or more of the following actions:
a. Configures assigned subnet
b. Potentially sets up VPN
c. Sets up a virtual network slice for the profile
d. Selects an existing virtual network slice for the profile The central broker 110, such as the Secure Network Slice Operations and Management Platform (SNS-OMP) 501 (see FIG. 5), that is coordinating slice setup using ONAP, obtains the transit route, and determines if each of the transit NEs are compliant with the policies per the enhanced digital certificate.

Extensions to ONAP, which are beyond the scope of the present disclosure, facilitate orchestrating and setting up transit NEs of multiple vendors for the policies in the eDC.

Enhancements in the transit network element include the following:
(a) forming a secure port group in the switch/L2-Bridge/Router with multiple interfaces based on where the remote switches that the interfaces connect to. For example, the secure port group may only allow those interfaces where the next hop NEs have specific characteristics, such as specific vendors/models/sw version, or other characteristics and
(b) allowing forwarding and route change only to ports within the allowed secure port group The physical or virtual ports identified above may be marked with a unique flag, or VLAN (IEEE 802.1Q) indicating the specific port is eligible to carry SNS traffic. For example, an operator may reserve a specific VLAN for a specific "SNS", pre-marking eligible ports that interconnect devices that hold Enhanced Digital Certificates.

The transit network over which the SNS logical network traffic traverses may include physical networks or virtual networks that include GRE tunnels, VPNs, or VXLANs of network service providers (CSPs) or Cloud Service Providers. The underlying virtual network layers such as Client OS, Hypervisor, VMs etc., may be manufactured by a plurality of vendors. Since security compromises in any of the underlying layers could severely impact the SNS traffic, it is essential that each underlying layer that carries the SNS traffic must be trust assured while setting up SNS for high security levels.

As seen in FIG. 5, the SNS-OMP 501 determines the network paths for a specific SNS Security level. The SNS-OMP 501 also needs to validate that each underlying layer in each transit NE holds the required eDC via the corresponding network control and management platform.

Figure 9:
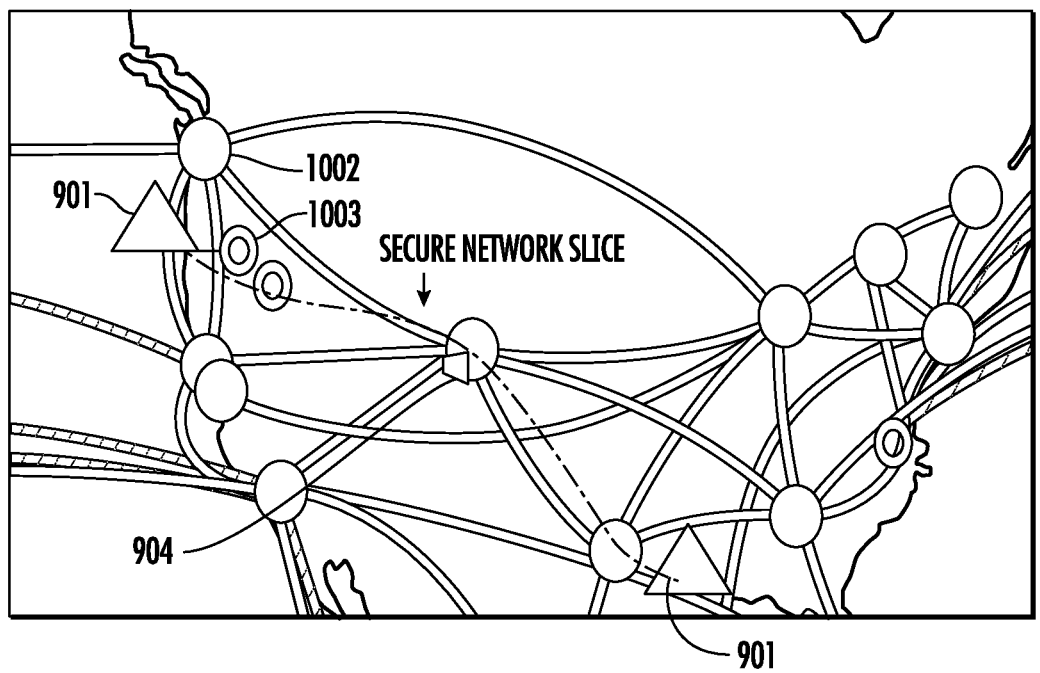
FIG. 9 shows physical network path maps through multiple operators and cloud service providers.

FIG. 9 shows the result of these steps. The enterprise locations 901 require secure network slices between the two locations, and also cloud hosted application servers 904. The SNS-OMP 501 (see FIG. 5) interacts with operations and management SNS-OMP 501 extracts geographical locations of operator network elements and cloud data centers, and the corresponding device identity attributes, identified as metadata extensions. These attributes could be embedded as eDCs in some devices or determined by the SNS-OMP 501 while setting up SNS based on required security policies.

The following steps show the process of re-validating trust before high security use.

Before using a secure network slice, an end user or enterprise application may want to validate that each NE in the path are trust compliant.

This may be accomplished by trace route to the destination system (if the destination's IP address is known) and verifying that each IP address in transit path holds an eDC through the central broker which in turn communicates with the operators' management platforms. The destination system may be a physical or virtual network element (VNF) such as a cloud hosted Webserver or Database Server. The trace route may not list all the local L3 forwarding addresses, or L2 forwarding devices in the operator network. For example, it may include entry point address at each service provider boundary, for example, if the slice traverses through 3 operator domains, A, B, C, the trace route may only list entry point address into A, B, C domains. Within domain A, operator may route traffic to B through multiple devices. The central broker, in co-operation with operator A's management platform, determines transit NEs to B and validates that each NE is allowed to carry the SNS traffic.

If the end user or enterprise is attempting to connect to a destination system, for example, a webserver using its domain name, the domain name is resolved to one or more IP addresses using well known DNS methods. After this, paths to each of the resolved IP addresses are validated using the technique described above. Finally, a path that meets the security policy requirements is selected.

In current network routing (Layer 3), and bridging (Layer 2) technologies, determining a network that packets traverse are determined by L2/L3 Network Addresses or other addresses based on the network technologies. Physical locations (Geographical Addresses/Regions) of each transit NE, or multiple layers of network technologies that a packet traverses are unknown and invisible to the end users or enterprises that use the service.

The network paths may include multiple CSPs, Cloud Service Providers and are not visible to the users using the service. A particular VNF that hosts a server, or proxy in the cloud could maliciously replicate or route traffic to secure compromised devices, or locations. If the transit paths and the associated physical/virtual elements (VNFs, Servers, Proxies etc., their locations, or device origins etc.) are known to the clients, they could explicitly avoid such paths to minimize risks. Additionally, the risk associated with a network path or network element may be dynamic, in the sense that after HW/SW upgrade to a device, or security holes of a device may come to light after long usage and may be known via public/private media (internet, security agencies, 3$^{rd}$ parties and others). The ability by which a client enterprise chooses or avoids transit paths and devices before using SNS significantly increases the security and trust of the SNS logical network.

Currently, there is no way that an end user or an enterprise that deals with highly classified information can find what physical locations, types of networks (dark-fiber, dedicated Lambda, SONET Transport, G-MPLS, SONET Tributaries (T1/T3/OCN), Cable etc.), that a virtual network or VPN traverses. In high security classified needs, Physical Perimeter Security and dedicated physical private networks are used. These solutions are expensive and limited, for example, in using a new site in a remote area requires building significant infrastructure with high cost.

As Virtualization, SDN, and cloud networks are replacing traditional networking, for highly classified enterprises, close to "perimeter security" with physical location maps, network types, vendor equipment, and other parameters is of high value. Network Routing is based on IP addresses, and with dynamic IP, and layering the paths below are unknown to the end enterprises.

A mechanism, analogous to using a map application, with visibility to network location/device, network technology and other features, with policy and validation methods for assuring path traversals is essential. The example below explains this use case, and associated requirements in transit network elements.

When user selects a map application, and enters location A in LA, California and B in Boston, Massachusetts, the map application gives alternative routes as:

1. Local transit roads at A, Highway 90 through Chicago to Boston, and local locations near B.
2. Local transit roads at A, Highway 80 through PA to NJ to Boston and local routes near B
3. It also shows other metrics such as Tolls, Traffic etc.

Considering the above analogy for a network, for highly classified uses, an enterprise needs a Classified Network slice from A to B (such as SL3); location A has 3 entry points, VZ/Fios, Comcast Cable, ATT/Wireless. From each of these entry points, the client wants to know which of the transit network locations are most secure, and decides which network types, vendors, equipment etc., carry the traffic, and what policies each Network Element (both physical and virtual) assures. The enterprise would also like to use "trace-physical", similar to trace-route (which shows transit IP address map), that shows transit paths with NE-Information, and Network Layers, before using network for a "Classified Transfer". Alternatively, instead of searching physical routes, the user enters the requirements in an operator portal, and the policy preferences could be contained in an enhanced Digital Certificate.

To support the configuration described above, a number of steps, which are outlined below, are required. These steps may include eDCs, metadata in APIs and interactions with a plurality of control and management platforms of different service providers.

First, the software module in each NE must support the embodiments described herein, such as returning underlying layer maps via a protocol, or via management paths.

Second, there needs to be a software module that forces policies on the underlying layers, such as no mirroring, no L2 Unknown DA flooding, and forming controlled port groups. This software module defines which physical or virtual Links are allowed to be static/dynamic/fail-over paths for carrying the network slice.

Next, an extension to Routing or Control Protocols to include additional constraints is necessary. Currently, L3 routing protocols are based on L3 addresses and lack any notion of other transit methods. For example, in Google Maps, one could select "METRO", and it shows "walk", "bus", "Metro-A", "Metro-B", "bus", "walk". Similarly, a comprehensive physical routing map envisioned in the present disclosure could show the pathway through the transit network, in addition to L3-destination based forwarding, and the corresponding operators. For example, an end to end network path may include connection to an AWS cloud server from an enterprise location in a remote town. The network path may have the following: internet via COMCAST, Verizon-FIOS in the access network, and Verizon may offer EVPL, or IP-VPN, or MPLS tunnel, Internet Service or other services at different SLAs through their network to connect to AWS. Similarly, a different CSP may offer connection from the remote site to AWS. The physical routing map envisioned includes these alternatives.

Next, there needs to be a method of identifying and discovering which transit NEs support the previous extensions. For example, the software modules described above could support a query mechanism or this function could be performed via management platforms.

Additionally, a Trace-Physical or Trace-All (similar to traceroute as explained earlier) features needs to be possible.

Further, methods for validation and assurance are needed. Specifically, there may be a software module in each NE that gives copy of each packet and all the interfaces (Physical, Virtual) that a particular network-slice packet went through when required.

For example, the dataflows through network slices may be mirrored or copied at network edges that connect to the slices or in the transit network below the slice using virtual probes in coordination with network control and management platforms, EMS or VSF and analyzed using offline or real-time analytic methods. The methods could characterize the behavior of a network such as delay, throughput, work load, number of sessions at the transport level or with application level analysis to orchestrate moving virtual resources, detect problems in the underlying shared virtual network, (for example, slow response time to a file server), DDOS attacks, choosing alternative transit network paths, or scheduling slice usage to different times to minimize security compromises.

In addition to specifying the path preferences for the Secure/Classified slice, the enterprise may also want to be alerted of path changes that might occur in operation.

The X.509 extensions outlined in the present disclosure facilitate trusted identity of the transit device in multiple dimensions that include hardware and virtualization layers, manufacturing, supply chain information and others. End users or an enterprise could extract full information on transit NEs while orchestrating SNS paths. It is envisioned that the APIs to users or enterprises will have a route selection option in the security orchestration interface for Ultra High Assurance (UHAs)+Ultra High Availability (UHAv), which would mean that the route would only use equipment and software with the correctly issued certificate matching the X.509 extension for UHAs+UHAv.

5G Architecture defines network slices with different QoS policies for a plurality of application services, such as IOT, Streaming Video, Healthcare and others, where the service requirements could be infrequent reliable message, or high BW for streaming during gaming event. QoS policies are specified in the Control plane (for example, via S1AP in LTE) while setting up user plane (UP) tunnels (GTP-U in UMTS, LTE). Once a UP tunnel is setup, QoS and the transit paths over which the tunnel traverses and UP tunnel terminates (for example, PGW in LTE) is determined. Thus, setting up a network slice with different security and trust requires adding security policy parameters. These additional security policy parameters may include, for example, Security Level to control plane protocols and require support by the associated network elements.

As an alternative, different APNs for different security levels (for example, SL1, SL2, SL3) may be employed. Since APNs are specified while creating UP tunnels, each SL could terminate in a different physical/virtual PDN gateway. User applications or enterprise applications could initiate different UP tunnels based on the security policy of the application.

5G Network spans several Radio, Mobile-Access and Core Networks with Physical, Virtual (SDN), and Private/Public Cloud Networks of multiple CSPs (Communications Service providers), Cloud Service Providers, and Internet. PKI infrastructure elements, located in the internet or selective locations in the core network, add significant latency for obtaining and validating certificates. With the exploding variety of mobile applications and micro services, the need to provide security without significantly increasing latencies is essential. Locating PKI infrastructure elements such as the CA, the TA, the RA and others, at different portions of the 5G Network Infrastructure, such as in 5G RAN, 5G Core, and opportunistically deploying such network elements as VNFs reduces latency significantly. For example, an analysis of the certification access interactions may be performed to determine where a security platform component may be best placed to reduce latency. For example, the security platform component may be disposed in the 5G RAN, a network operated by a service provider or an SDN. These elements assist in faster setup and operational use of a secure network slice. Thus, in certain embodiments, PKI may be offered as a service (PKIaas). Such deployments require that the Mobile Native Security Platform (mSA) element understands the Control Plane and/or User plane Protocols where it is connected.

Such a deployment may be transparent where it intercepts the mobile network protocol (for example, intercepting GTP-U user plane protocol) and terminate and process Requests to the mSA. Alternatively, operator may use a specific APN that may use services from mSA. mSA may be specified as a DNS name that maps to a plurality of mSA's at different locations in operator network. Well known DNS methods facilitate associating multiple physical/virtual servers. Within the mobile network below the PGW, since the UP traffic is embedded in transport layer GTP-U tunnels, transit mobile network would have to selectively terminate DNS packets that involve mSA, and route to mSA. Alternatively, operator may use a designated DNS server for the APN, and tunneled UP traffic to that server intercepted. Once specific tunneled traffic is received, the mSA would have to support extracting the user payload traffic for mSA interactions. mSAs could be cloud based servers or proxies for deployment at mobile network edge for latency reduction for security related interactions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of defining a secure network slice in a multi-domain network, comprising:

incorporating an enhanced digital certificate into a plurality of network devices in the multi-domain network, wherein the enhanced digital certificate comprises metadata regarding a provenance of the network device;

determining one or more forwarding paths through the network that connect two endpoints;

querying each network device along each of the one or more forwarding paths to determine if each network device comprises the enhanced digital certificate; and defining the secure network slice as a forwarding path between the two endpoints wherein each network device in the forwarding path has an enhanced digital certificate having desired parameters.

2. The method of claim 1, wherein the multi-domain network comprises at least one of an enterprise network, a cloud provider, a communications service provider, a SDN, physical/virtual network segment, a 5G radio access network and a 5G core network.

3. The method of claim 1, wherein the metadata is selected from the group consisting: hardware or software make;
hardware or software model or release; a region where the network device is manufactured; and a location where the network device is manufactured.

4. The method of claim 2, wherein an Operation Management Platform (OMP) is employed by the service provider for a network domain, and the OMP provides access to the enhanced digital certificates of network devices disposed in the network domain.

5. The method of claim 2, wherein an Operation Management Platform (OMP) is employed by the service provider for a network domain, the OMP creates a forwarding path in the network domain using only network devices that have the enhanced digital certificate, and wherein the forwarding path created by the OMP is used to create the secure network slice.

6. The method of claim 5, wherein a second OMP is employed by a second service provider for a second network domain, and wherein the second OMP creates a forwarding path in the second network domain using only network devices that have the enhanced digital certificate, and wherein the forwarding path from the second OMP is combined with the forwarding path from the service provider to create the secure network slice.

7. The method of claim 1, wherein the desired parameters comprise that the network device was manufactured in one of a selected group of countries.

8. The method of claim 1, wherein one of a plurality of security levels is supported by the secure network slice.

9. The method of claim 8, wherein a first security level requires each network device comprise an enhanced digital certificate indicating that the network device was manufactured in one of a selected group of countries.

10. The method of claim 9, wherein a second security level requires all limitation of the first security level and also disables port mirroring and flooding.

11. The method of claim 10, wherein a third security level requires all limitations of the second security level and forces a specific forwarding path, such that upon interface failures, traffic is not redirected or redirected to an alternative path that is not validated.

12. The method of claim 1, wherein the enhanced digital certificates of the network devices disposed in the secure network slice are revalidated periodically.

13. The method of claim 1, wherein each of the network devices in the secure network slice restricts its usable interfaces to only those interfaces that are in communication with other network devices having an enhanced digital certificate having the desired parameters.

14. The method of claim 1, wherein the network devices comprise hardware and software components.

\* \* \* \* \*